United States Patent
Armstrong

[15] 3,666,911
[45] May 30, 1972

[54] METHOD FOR MANUFACTURING PLANAR RAISED CATHODE GAS TUBES

[72] Inventor: James B. Armstrong, Phoenix, Ariz.
[73] Assignee: Sperry Rand Corporation
[22] Filed: Jan. 23, 1970
[21] Appl. No.: 5,436

[52] U.S. Cl. .............................................. 219/117, 219/78
[51] Int. Cl. ........................................................ B23k 9/00
[58] Field of Search ...................... 219/91, 78, 117; 29/625

[56] References Cited

UNITED STATES PATENTS 2,399,753   5/1946   McLarn .................................. 219/78

Primary Examiner—J. V. Truhe
Assistant Examiner—Hugh D. Jaeger
Attorney—S. C. Yeaton

[57] ABSTRACT

A method for fabricating segmented planar raised cathode elements in an alphanumeric display gas tube employing a weld and de-weld process.

2 Claims, 11 Drawing Figures

Patented May 30, 1972

INVENTOR
JAMES B. ARMSTRONG
BY

ATTORNEY

Patented May 30, 1972
3,666,911
4 Sheets-Sheet 2
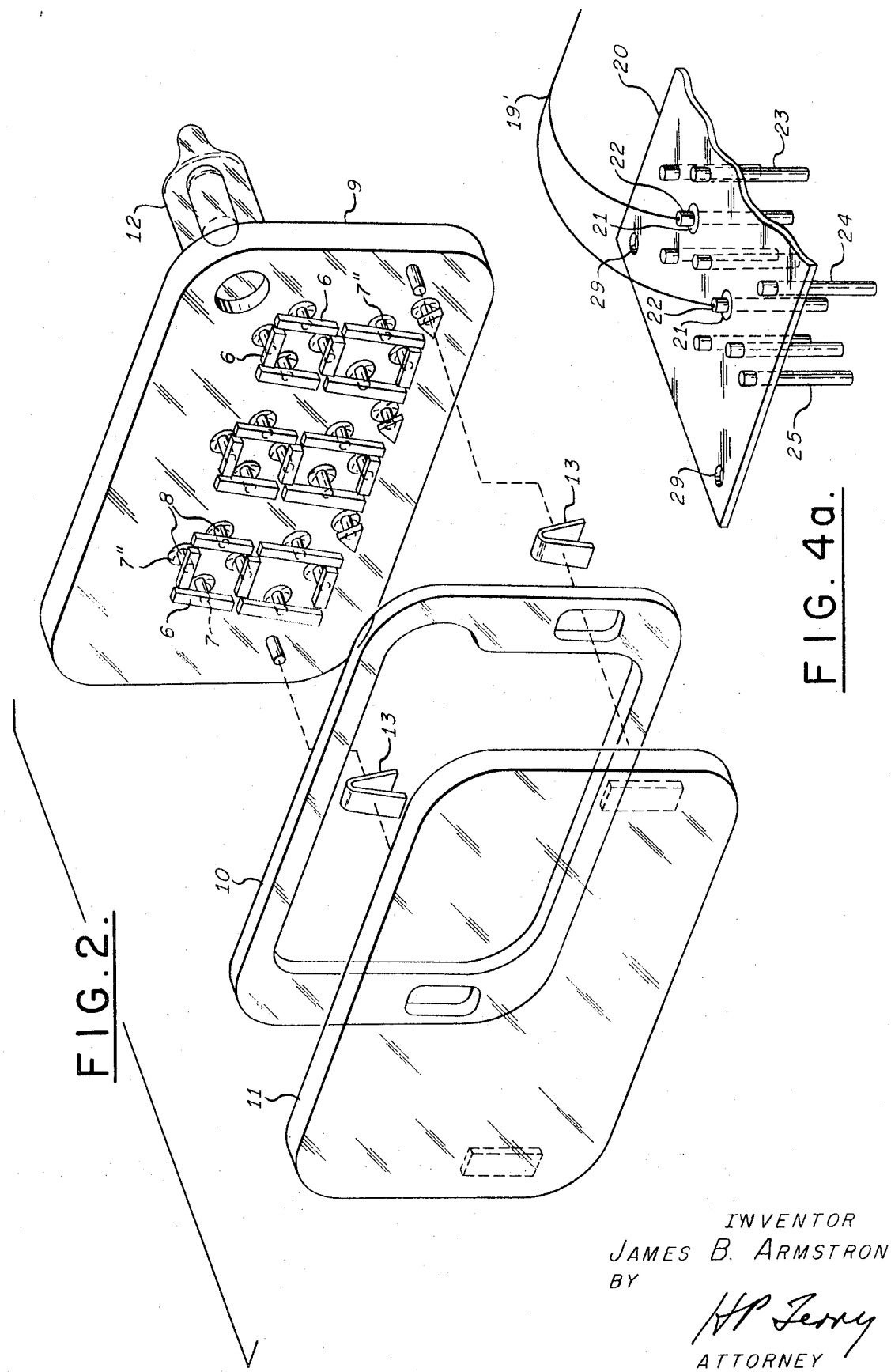
INVENTOR
JAMES B. ARMSTRONG
BY
*H P Jerry*
ATTORNEY Patented May 30, 1972  3,666,911

INVENTOR
JAMES B. ARMSTRONG
BY
*H.P. Terry*
ATTORNEY

METHOD FOR MANUFACTURING PLANAR RAISED CATHODE GAS TUBES

BACKGROUND OF THE INVENTION

1. Cross References

This invention relates to a method for fabricating planar raised cathode alphanumeric indicators of the gas discharge type, such as disclosed in the co-pending patent application, "Planar Raised Cathode Alpha-Numeric Gas Discharge Indicator," Ser. No. 742,662, filed July 5, 1968, assigned to the same assignee as the present invention.

2. Description of the Prior Art

The assembly of a gas tube requires two flat glass plates (an anode and cathode plate), a spacer between these two plates, and a fill tube. These four parts are sealed together to form a hermetic envelope. The envelope is then evacuated, back filled with ionizable gas such as neon, and sealed. In order to obtain the required display information, dc power is applied between the transparent electrode on the anode plate and a predetermined array of segments on the cathode plate. The application of power between opposing electrodes causes the gas between them to ionize and visibly form the desired number or letter.

Previously, the construction of planar segmented cathodes for alpha-numeric gas tubes has revolved, with a limited periphery, around the basic method of vacuum depositing segmented cathodes on a flat glass plate. The vacuum deposited type of numeric gas tube suffers from serious operational limitations as low resistance paths build up between the segmented cathodes. To overcome this problem, channels between each segment have been implemented. The channeling technique has definite requirements in terms of width, depth, and a sharp edge. Such a combination is very delicate and difficult to achieve without error and consequently has a high discard rate. In addition, glass breakout between the channel and feed-through pin becomes a problem in lapping and polishing the cathode plates.

SUMMARY OF THE INVENTION

The method of the instant invention is directed to the fabrication of the planar raised cathode plates and provides a convenient and expeditious process for attaching the cathode elements to electrical connections (pins). The method may comprise the following discrete steps. A sheet in the form of a blank is processed to delineate the outline of the elements with the exception of connecting tabs. The resulting sheet is stencil-like in that material in the shape of short channels between the elements and the sheet is removed, but the desired elements remain. In a separate step, the central portions of pins are imbedded in a glass substrate such that the extremities of the pins extend therefrom. The above two assemblies are then juxtaposed in such a manner that each pin is adjacent to an element. After the positioning, the elements are welded to their respective pins. An electrical current is passed through each element and the still attached sheet and discard pieces to separate the elements. The path of this current must necessarily be through one or more of the tabs, and because of their relative high resistance, will generate sufficient heat to burn them off (referred to as the de-weld process). Thusly, the elements are separated from the sheet and the other discard pieces. The segmented raised planar cathode element assembly is now ready to be combined with the spacer, plate and the fill tube.

A primary object of this invention is to provide a simple and inexpensive method for positioning and aligning the cathodes during the base assembly of gas tube fabrication.

Another object of the invention is to provide a method for positioning and aligning in-plane anode and cathode elements.

Another object of the invention is to provide a method particularly suitable to mass production techniques Another object of the invention is to provide predictable operating parameters.

Another object of the invention is to provide ultra-long theoretical useful life of the resulting display device.

BRIEF DESCRIPTION OF THE DRAWINGS

FIG. 2 is an exploded view of the components of the complete planar alphanumeric raised cathode gas discharge tube.

FIG. 4a illustrates a configuration of the electrodes for the weld and de-weld process.

DETAILED DESCRIPTION OF THE INVENTION

Figure 1:
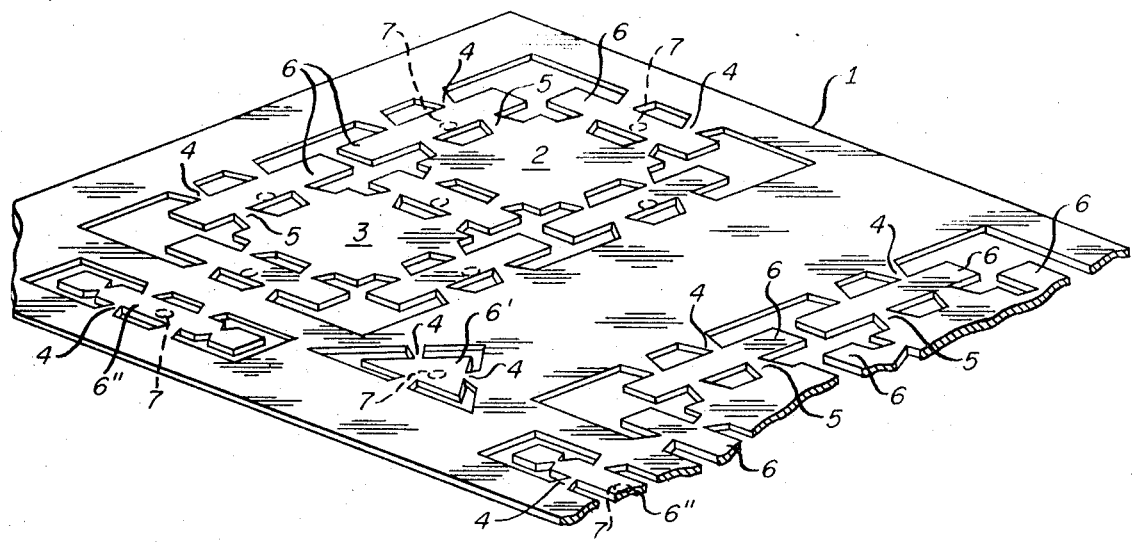
FIG. 1 illustrates the structure of the stencil-like cathode sheet prior to welding the elements to the connector pins.

In FIG. 1 there is shown a chemically treated plate 1 having a nominal thickness of 0.005 inches and chemically processed or otherwise fabricated to obtain an outline of parts as shown. The processed sheet is similar to a stencil in general configuration. However, instead of the desired figures being removed as in a stencil, the material representing intermittent channels forming the outline of the desired figures is removed.

The elements are processed from sheet 1 but remain connected thereto by at least one point of connection and may be processed by any number of well known processes, such as stamping, etching, cutting by laser, ultrasonic means, electroforming, or electrical discharge machining. Presently, satisfactory results in terms of cost and accuracy have been obtained by etching. The process is two-fold in that first one side is etched until half the depth of the material to be removed is removed. Secondly etching is completed from the other side, but this time the fusible tabs are subjected to the etching process. The advantages obtained are that the fragile tabs are not very susceptible to unintentional breakage and that the thickness of the tabs can be reduced to any desired size.

Figure 1A:
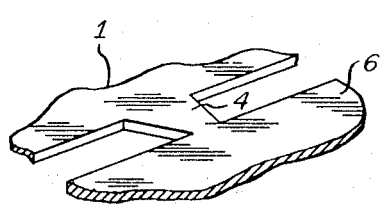
FIG. 1a illustrates the trapezoid shaped connections between the elements and the waste material.
Figure 1B:
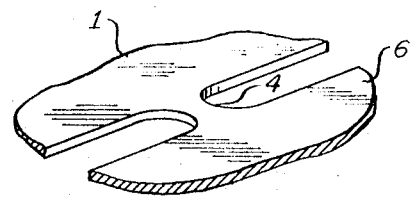
FIG. 1b illustrates another embodiment of the connections between the elements and the waste material.
Figure 1C:
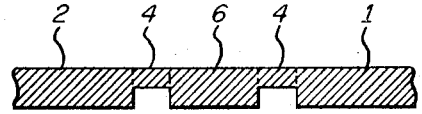
FIG. 1c illustrates another embodiment of the connections between the elements and the waste material where the thickness of the connection has been reduced.

The desired elements 6 remain joined to the surrounding sheet 1 by trapezoidal or triangular connections 4 and to the inside or circumscribed portions 2, 3 of the sheet by similar connections 5. The connections 4 and 5 may have any of the suggested configurations in FIG. 1a and FIG. 1b or variations thereof. The only requisite of the configuration is that it have sufficiently narrow cross section to provide a high resistance path to a current passed through it. A further variation is shown in FIG. 1c and illustrates that the cross section may be further reduced by having the connections 4 and 5 thinner than the adjacent sheet 1, 2, 3, and element 6. The orientation and size of the elements 6, processed in sheet 1 may be of any configuration and depend only upon the nature of the characters desired.

Figure 2A:
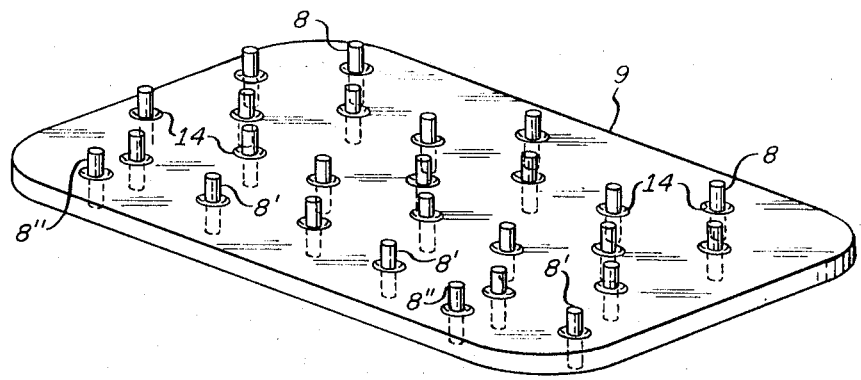
FIG. 2a is a perspective view of the tube base.
Figure 3:
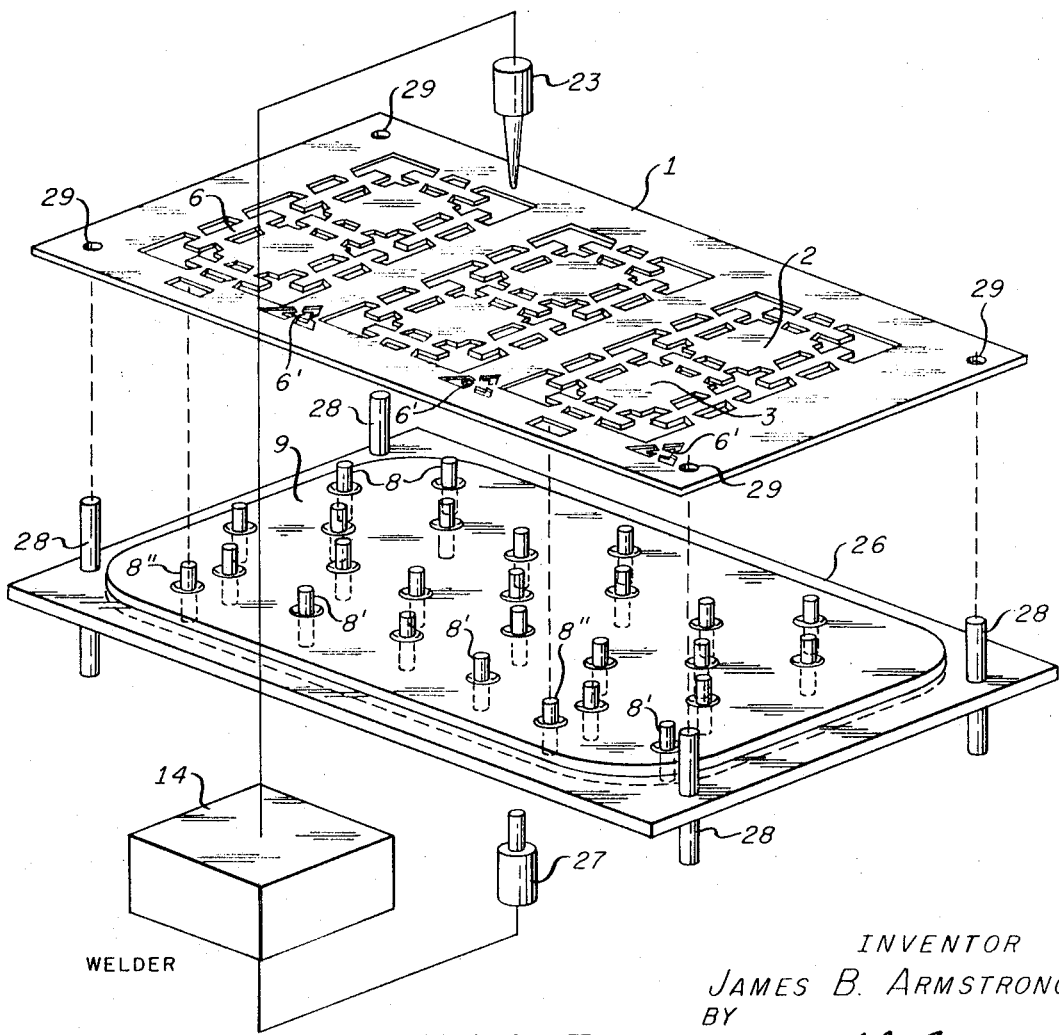
FIG. 3 illustrates a method for welding and de-welding.

Sheet 1 may, in addition, contain a representation of a decimal point as indicated by element 6' The principle is the same as for elements 6 in that element 6' is connected to sheet 1 by fusible tabs 4 and is welded at its approximate center to pin 8' (FIG. 3). Similarly, element 6" may be formed from sheet 1, but connected thereto by fusible elements 4. Element 6" may also have small indentations on either side as indicated in FIG. 1 to facilitate bending of the outermost parts after welding so that the raised ends made contact with anode 11 (FIG. 2). Other configurations may also be used to obtain a pressure contact with anode 11.

Referring to FIG. 2a, the glass substrate 9 is apertured to receive a number of electrical connecting pins 8 which are hermetically sealed to substrate 9. The ends of pins 8 on the upper side of substrate 9 extend a predetermined distance;

good results are obtained with a distance of about 0.005 inches. The pins extend below the substrate 9 bottom surface a convenient distance suitable for connection with a mating receptable or other electrical attachment. A preferred method of manufacturing the substrate 9 and pins 8 (and 8', 8''), assembly may be that of having the pins sealed in the substrate as previously discussed with the pins 8 (and 8', 8'') initially mounted flush with the upper surface of substrate 9. The side of the substrate having the flush pin terminations is then etched away so as to expose the desired length of each pin above the etched substrate surface. During etching, a cup-shaped indentation or moat 7'' is formed in the substrate around the base of each pin. The moats formed during the substrate etching process result from the use of a substrate-pin combination which produces compressively strained seals; these strained glass seal areas etch more rapidly than the unstrained portions of the substrate. The advantage of the latter method is that of an increased operational life as a low resistance path between pins formed by sputtered products is inhibited. Further details of the sputtered products effects are discussed in pending application entitled "Planar Raised Cathode Alpha-Numeric Gas Discharge Indicator," Ser. No. 742,662, filed July 5, 1968.

Figure 1D:
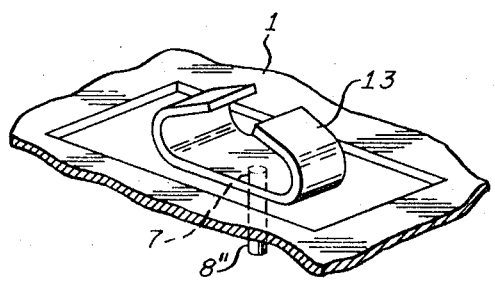
FIG. 1d illustrates a method for implementing the instant invention to position the anode contact on a pin in the cathode substrate.

The heart of the present invention is the manufacturing process for combining the sheet 1 and substrate 9 to form the cathode assembly shown. The presently known best mode of joining the elements to the pins is that of electrical welding. However, it is anticipated that other means for accomplishing the bond may be employed if circumstances indicate that another method is preferable. In FIG. 3 the stamped sheet 1 is aligned by registration means 28 and 29 with the substrate 9 and pin 8 assembly so that each of the pins 8 will contact one of the elements 6. For purposes of explaining the invention, only element 6 and pin 8 will be discussed, and it is understood that the discussion is also true for elements 6', 6'' and 8', 8''. The number of pins 8 per segment 6 is dictated, not by electrical requirements of function of the gas tube, but by the mechanical rigidity required. After alignment, a lower or first electrode 27 of a welding current source 14 is attached to a pin 8 and an upper, or second, electrode 23 is placed on the associated segment 6 in proximity to the pin 8 under the element 6. Slight pressure is applied to the upper electrode to insure physical contact between the element 6 and pin 8. Current of a predetermined magnitude and for a predetermined time flows between the electrodes causing the pin 8 to become welded to the element 6. This process is repeated for each pin/segment combination. Sheet 1 may also have a rectangular hole with its center approximately in alignment with pin 8'' and after welding elements 6 and 6' but before de-welding, a triangular or a V-shaped element 13 (see FIG. 2) may be positioned in the hole (see FIG. 1d) the latter's outline being used as a positioning guide, and welding the triangular or V-shaped element to pin 8''.

To separate the elements 6 from sheet 1 and waste material 2 and 3, a method of de-welding is used. The trapezoidal-like shaped connections 4 and 5, referred to hereinafter as tabs, are of relatively small cross section. As such, they constitute a high resistance path to an applied current. Any current passed through the tabs will cause a heat buildup and if the current is large enough, the generated heat will melt the tabs. The burnoff process is accomplished by attaching an electrode 23 of the current source 14 to an element 6 and a second electrode 27 is connected to either the waste material 2 or 3 or sheet 1. A current will then flow from the first electrode 23 through the element 6, through one or more of the tabs 4 and 5 joining the tab to either of waste material 2 or 3, or sheet 1, and thence to the second electrode 27. The current will continue to flow until the heat buildup in the tab or tabs is sufficient to melt the tab or tabs. When the tabs melt, the current path is an open circuit indicating that the connection between the element 6 and the waste material 2 or 3 or sheet 1 is severed. This process can be repeated for each of the elements until each is free of surrounding material. The de-weld operation may be enhanced if sheet 1 is slightly raised above the pins. After welding, there will be a slight tension on the tabs which will provide a positive severing force on the tabs. The size and duration of the current for both the weld and de-weld processes may not be of such magnitude as to cause damage to the glass substrate 9. An advantage of this method is that of speed and it also tests the weld 7 for a good electrical and physical contact.

Figure 4:
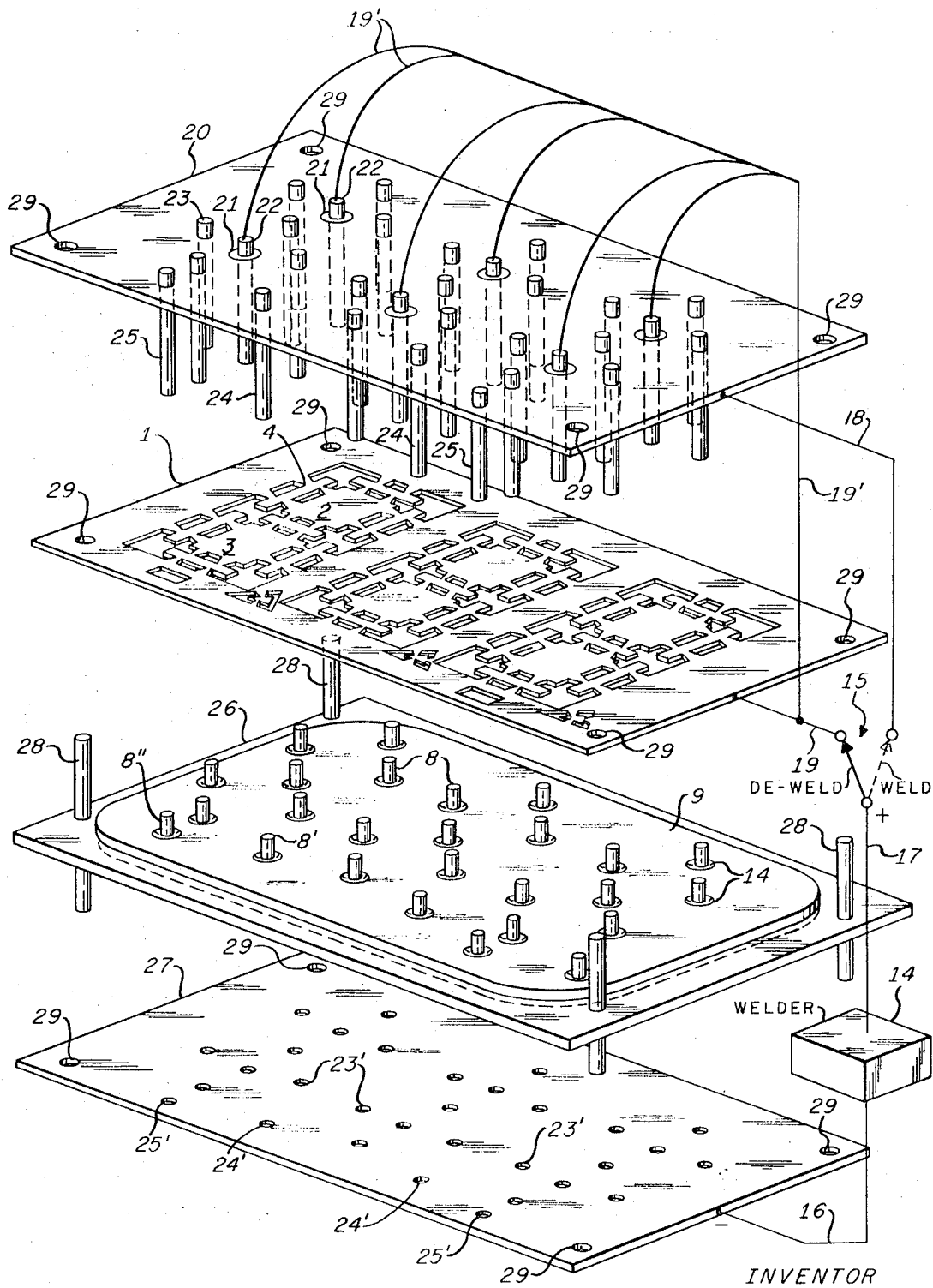
FIG. 4 illustrates a method for using various jigs and plates to implement the instant invention on a mass production basis.

Referring to FIG. 4 and 4a, there is illustrated apparatus suitable for implementing the instant invention on a mass production basis. The glass substrate 9 with embedded pins 8, 8' and 8'' (cooperating with elements 6, 6' and 6'' or 13, respectively) is placed in a jig 26. Jig 26 is adapted to hold glass substrate 9 securely and is sufficiently thin to allow pins 8, 8' and 8'' to extend therethrough. The jig 26 has two or more alignment rods 28 extending from both sides. Base 27 is slidably adapted by means of alignment holes 29 to receive the bottom of rods 28 of jig 26 and contains holes 23', 24' and 25' positioned to receive and make a good electrical contact with pins 8, 8' and 8''. Base 27 is connected to an electrode 16 the current source 14 (the negative terminal being shown). For ease in orienting the elements 6 to the pins 8, sheet 1 has one or more alignment holes 29 which cooperate with rod or rods 28. Plate 20 is of electrically conducting material and has connected thereto a plurality of electrodes 23 (see FIG. 4a) so arranged that each corresponds to one of elements 6 and is in general alignment with pins 8; similarly, electrodes 24 and 25 are connected to plate 20 to cooperate with elements 6' and 6'' and are aligned with pins 8' and 8'', respectively. Pins 22 are connected to plate 20 but electrically insulated therefrom by material 21. One of pins 22 cooperates and is in general alignment with waste material 2, and the other cooperates and is in general alignment with waste material 3. There is connected to each of pins 22 an electrical lead 19'. Plate 20 contains one or more alignment holes 29 which cooperate with rod or rods 28. The welding current source 14 may be any suitable welder wherein the magnitude and duration of the welding current can be controlled. One electrode of the welder is connected to base 27 and the second electrode to the common pole of single pole double throw switch 15. One output of switch 15 is connected to plate 20 by lead 18 and the other output to sheet 1 by lead 19 and pins 22 by lead 19'.

In operation, the glass substrate 9 is placed in jig 26. The jig is then placed on base 27 with the registration means (28 and 29) aligned and pins 8, 8' and 8'' inserted in their respective holes 23', 24' and 25'. Next, sheet 1 is slidably placed on top of jig 26 by using registration means 28 and 29. Finally, plate 20 is placed over sheet 1 with holes 29 of the plate aligned with rod 28. The pins 22, 23 and 24 and 25 will then be in contact with and at the approximate centers of elements 2 and 3, 6, 6' and 6'' respectively. In the weld operation, the switch 15 is positioned to connect line 17 with line 18. The current path is then established through base 27, pins 8, 8' and 8'', elements 6, 6' and 6'', pins 23, 24 and 25 and plate 20. In the de-weld operation the current path is through the pins 8, 8' and 8'', elements 6, 6' and 6'', tab 4 sheet 1 and lead 19 to switch 15 and through pins 8, 8' and 8'' elements 6, 6' and 6'', tabs 5, waste material 2 and 3, pins 22 and lead 19' to switch 15. The current passing through elements 6, 6' and 6'' to the sheet 1 and to waste material 2 and 3 is of sufficient magnitude to cause burn-off of fusible tabs 4 and 5. The current will flow until all tabs 4 and 5 are melted and create an open circuit. Some means may be required to keep the magnitude of the current inversely proportional to the number of melted tabs. At this point each of the elements is attached to its respective pin and the manufacturing ensemble can be dismantled. The module comprised of the glass substrate 9 pins 8, 8' and 8'' and elements 6, 6' and 6'' is now ready for assembly with the spacer 10 and anode 11.

Variations of the above mass production process are anticipated and the parameters, such as separation and/or pressure between pins 23, 24 and 25, elements 6, 6' and 6'' and pins 8, 8', and 8'' before and after application of current, will have to be finalized through production runs. Additional modifications of the above de-weld operation and current are anticipated and the methods described are only exemplary.

The method of the instant invention easily lends itself to a variety of gas tube configurations. One of these configurations may be to have both the anode and the cathode of the gas tube within the same plane. In this embodiment, the discard pieces within the sheet or portions thereof will constitute the anode and may be affixed to additional pins as discussed in respect to the cathode elements. After the anode pieces are affixed, they may be segregated from the sheet and/or the cathode elements by one of the disclosed methods of "burning off" the connection tabs. The "burn off" may be prior to, simultaneous with, or subsequent to the "burn-off" of the cathode elements.

Test results indicate that the process for element fabrication and connection can be reduced by the instant method without using mass production techniques to one hour from four hours for the vacuum deposit method. The advantageous results are due to the relative simplicity of spot welding and segregating the pre-aligned elements in the segmented planar raised cathode electrode form of gas tube compared to the very tedious alignment, special handling precautions, and small quantity of vacuum deposit batches possible in the vacuum deposited cathode form of gas tubes.

While the above discussion has related to methods of electrically welding and de-welding the elements of the pins, the invention is not intended to be limited to those methods. Any other methods of bonding and segregating such as direct heat application, using a laser beam, applying sonic means, or by chemical reactions are anticipated.

While the invention has been described in its preferred embodiment, it is to be understood that the words which have been used are words of description rather than limitation and that changes within the preview of the appended claims may be made without departing from the true scope and spirit of the invention in its broader scope.

I claim:

1. A method for fabricating a cathode array and base assembly of an gas discharge type display tube comprising the steps of providing a substantially planar non-conductive tube base having electrically conductive cathode support pins passing in hermetically sealed relation through the base and extending upward from at least one surface thereof, providing a stencil-like electrically conductive sheet having cathode segments formed therein in a predetermined pattern, the outline of said segments being formed by removal of sheet material around the periphery of the segments except at discrete locations where small cross-sectional area segments of the sheet material form tabs connecting the segments to the sheet so as to support the segments in the plane of the sheet, placing the stencil-like sheet in registered superposed relation with the tube base so that a single point of each cathode segment is positioned adjacent an extending end of a mating support pin with the sheet and tabs holding the undersurface of the segments in a common plane closely above the tube base, bonding each cathode segment to a mating support pin at the single point of the individual segments adjacent the respective support pins to establish a mechanically rigid electrical connection therebetween such that the cathode segments will remain substantially in said common plane upon being disconnected from the stencil sheet, melting the tabs to sever the cathode segments from the remaining portion of the sheet to be discarded, and removing the portion of the sheet to be discarded.

2. A method for fabricating a cathode array and base assembly of an alpha-numeric gas discharge tube comprising the steps of providing a substantially planar non-conductive tube base having electrically conductive cathode support pins passing in hermetically sealed relation through the base and extending upward from at least one surface thereof, providing a stencil-like electrically conductive sheet having cathode segments formed therein in a predetermined pattern, the outline of said segments being formed by removal of sheet material around the periphery of the segments except at discrete locations where small cross-sectional area segments of the sheet material form tabs connecting the segments to the sheet so as to support the segments in the plane of the sheet, placing the stencil-like sheet in registered superposed relation with the tube base so that a single point of each cathode segment is slightly spaced above an extending end of a mating support pin in non-contacting relation therewith, the sheet and tabs thereby holding the undersurface of the segments in a common plane above the tube base, applying an electrical potential across each segment and mating support pin while simultaneously exerting pressure on the segment to move it into contact with the mating pin to effect a weld therebetween for securing the segments to the respective pins with resulting tension exerted on the tabs, applying an electric potential across each cathode segment and the remaining portion of the sheet to be discarded to melt the tabs whereby affirmative disconnect is affected between the segments and sheets as a consequence of the tension exerted on the tabs, and removing the portion of the sheet to be discarded.

* * * * *